United States Patent
Hsu et al.

(10) Patent No.: US 8,572,360 B2
(45) Date of Patent: Oct. 29, 2013

(54) BOOTSTRAP SYSTEM FOR DUAL CENTRAL PROCESSING UNITS

(75) Inventors: Chan-Kuei Hsu, Tu-Cheng (TW); Tsung-Kuel Liao, Tu-Cheng (TW); Te-Chung Kuan, Tu-Cheng (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 451 days.

(21) Appl. No.: 12/975,240

(22) Filed: Dec. 21, 2010

(65) Prior Publication Data

US 2012/0102308 A1 Apr. 26, 2012

(30) Foreign Application Priority Data

Oct. 20, 2010 (TW) ............................... 99135722 A

(51) Int. Cl.
*G06F 15/177* (2006.01)
*G06F 11/00* (2006.01)

(52) U.S. Cl.
USPC ................................... 713/1; 713/2; 713/100

(58) Field of Classification Search
None
See application file for complete search history.

(56) References Cited

U.S. PATENT DOCUMENTS

| | | | | |
|---|---|---|---|---|
| 5,530,946 | A * | 6/1996 | Bouvier et al. | 714/23 |
| 2009/0240981 | A1* | 9/2009 | Tra et al. | 714/13 |
| 2011/0154106 | A1* | 6/2011 | Kelly et al. | 714/10 |
| 2011/0246818 | A1* | 10/2011 | Takada et al. | 714/6.2 |

* cited by examiner

*Primary Examiner* — Dennis M Butler
(74) *Attorney, Agent, or Firm* — Altis & Wispro Law Group, Inc.

(57) ABSTRACT

A bootstrap system for dual central processing units includes a south bridge, a first central processing unit, a second central processing unit and a switch control module. The south bridge provides enable signals and reset signals, the first central processing unit provides an identification signal and an operation signal. The second central processing unit receives the enable signals and reset signals. The switch control module receives the identification signal and the operation signal from the first central processing unit to generate a corresponding switch command signal. The south bridge is selectably and electrically connected to the first central processing unit or the second central processing unit under the control of switch command signal.

20 Claims, 6 Drawing Sheets

US 8,572,360 B2

BOOTSTRAP SYSTEM FOR DUAL CENTRAL PROCESSING UNITS

BACKGROUND

1. Technical Field

The disclosure generally relates to bootstrap systems, and more particularly relates to, a bootstrap system used for dual central processing units (CPUs).

2. Description of the Related Art

To improve operation efficiency and stability, computers and other terminal servers often employ dual central processing units (CPUs). The dual CPUs are electrically interconnected to each other through quick path interconnect (QPI). The main CPU of the two CPUs is usually used as a bootstrap processor (BSP) and is electrically connected to a south bridge through a direct media interface (DMI) bus.

However, in such connections, the dual CPUs are able to perform the bootstrap programs normally only when the BSP maintains normal operation. When the BSP is damaged and/or fails to operate normally, even if the other CPU works properly, the dual CPUs are unable to perform the bootstrap programs normally.

Therefore, there is room for improvement within the art.

BRIEF DESCRIPTION OF THE DRAWINGS

Many aspects of an exemplary bootstrap system for dual central processing units can be better understood with reference to the following drawings. The components in the drawings are not necessarily drawn to scale, the emphasis instead being placed upon clearly illustrating the principles of the exemplary bootstrap system for dual central processing units. Moreover, in the drawings, like reference numerals designate corresponding parts throughout the several views. Wherever possible, the same reference numbers are used throughout the drawings to refer to the same or like elements of an embodiment.

DETAILED DESCRIPTION

Figure 1:
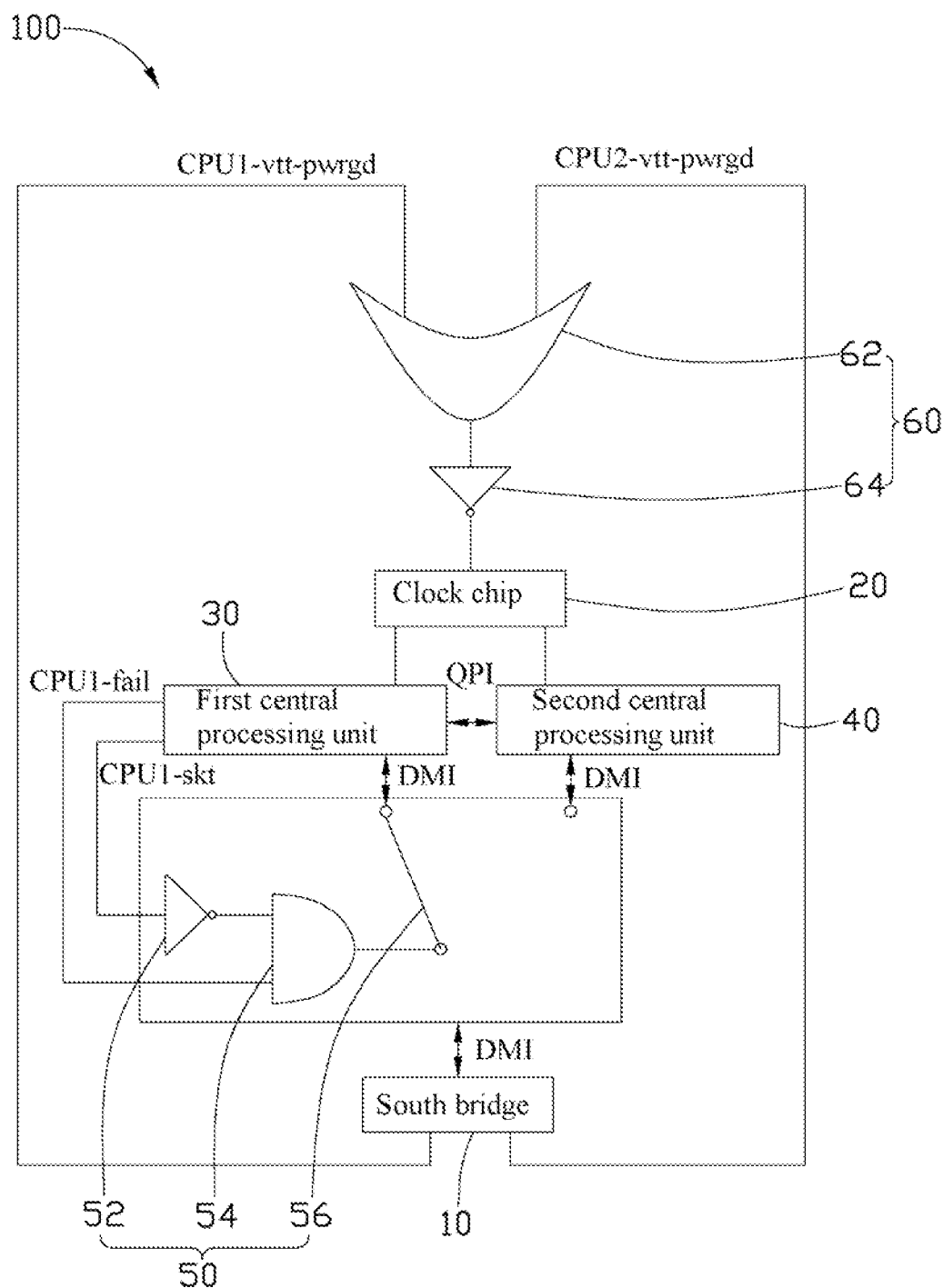
FIG. 1 is a circuit view of a bootstrap system for dual central processing units including a south bridge, a first central processing unit, a second central processing unit, a switch control module and a clock enable circuit, according to an exemplary embodiment.
Figure 2:
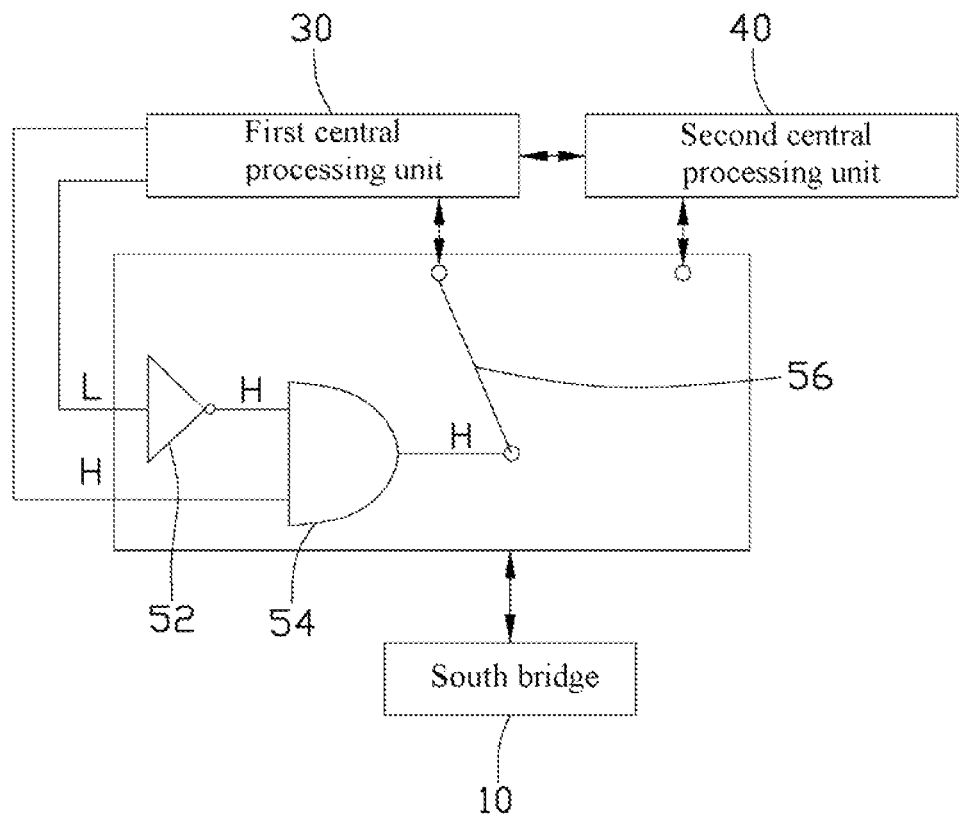
FIG. 2 is a circuit view when the south bridge electrically connects the first central processing unit working normally of one embodiment as shown in FIG. 1.

FIGS. 1 and 2 show a bootstrap system 100 for dual central processing units (CPUs) used in terminal devices (not shown), such as computers. The bootstrap system 100 includes a south bridge 10, a clock chip 20, a first CPU 30, a second CPU 40, a switch control module 50, and a clock enable circuit 60, which are located on a mainboard (not shown) of the terminal device.

The south bridge 10 can be a Patsburg chipset and is capable of respectively providing enable signals CPU1-vtt-pwrgd and CPU1-vtt-pwrgd for the first CPU 30 and the second CPU 40 to provide power management, allowing the first CPU 30 and the second CPU 40 to work, sleep or shut down. The south bridge 10 is further operable to provide and send reset signals for the first CPU 30 and/or the second CPU 40.

The clock chip 20 is electrically connected to the first CPU 30 and the second CPU 40. The clock chip 20 includes a crystal oscillator (not shown) and a clock generator (not shown). The crystal oscillator is operable to generate and provide clock frequencies, and the clock generator is capable of adjusting the clock frequencies from the crystal oscillator to generating and providing corresponding clock signals for the first CPU 30 and the second CPU 40.

The first CPU 30 is electrically connected to the second CPU 40 through quick path interconnect (QPI), and the first CPU 30 is defined as the main processor. The first CPU 30 and the second CPU 40 begin to work when receiving the clock signals from the clock chip 20 and the reset signals from the south bridge 10. The first CPU 30 and the second CPU 40 are capable of sending address instructions to the basic input output system (BIOS) chip built into the mainboard so it can load and start the operating system. In addition, initialize and identify the operating system such as video display card, hard disk and other hardware, to enable the terminal device to start normal operation.

In this exemplary embodiment, the first CPU 30 is used as a boot strap processor (BSP), whose priority is higher than the second CPU 40. The first CPU 30 includes an identification pin (not shown). When the first CPU 30 is installed on the mainboard, the identification pin generates a low level identification signal CPU1-skt(L). Meanwhile, the first CPU 30 triggers and sends an operation signal CPU1-fail, therefore, when the first CPU 30 is in a normal operation state, the operation signal CPU1-fail is high; when the first CPU 30 is in a damaged and/or abnormal operation state, the operation signal CPU1-fail is low.

The switch control module 50 is electrically connected to the south bridge 10, the first CPU 30 and the second CPU 40 through direct media interface (DMI) bus. The switch control module 50 includes a first inverter 52, an AND gate chip 54 and a switch 56. The first inverter 52 can be a NOT gate chip and includes an input port and an output port, the AND gate chip 54 includes two input ports and an output. The input port of the first inverter 52 is electrically connected to the identification pin of the first CPU 30 to receive the low-level identification signal CPU1-skt(L). In addition, the output port of the first inverter 52 is electrically connected to an input port of the AND gate chip 54, the other input port of the AND gate chip 54 is electrically connected to the first CPU 30 to receive the operation signal CPU1-fail.

The output port of the AND gate chip 54 is electrically connected to the switch 56, providing a switch command signal for the switch 56, so the south bridge 10 is selectably and electrically connected to the first CPU 30 or the second CPU 40 under the control of the switch command signal. For example, when the output port of the AND gate chip 54 provides and outputs a logical 1 switch command signal to the switch 56, the switch 56 is then electrically connected to the first CPU 30. When the output port of the AND gate chip 54 outputs a logical 0 switch command signal to the switch 56, the switch 56 then is accordingly switched to electrically connect the second CPU 40.

The clock enable circuit 60 is a low enabled circuit, that is, when the clock enable circuit 60 receives a low level signal, the clock enable circuit 60 is enabled and can output a corresponding high level signal. The clock enable circuit 60 includes an OR gate chip 62 and a second inverter 64. The OR gate chip 62 includes two input ports and an output port, and the second inverter 64 includes an input port and an output port.

The input ports of the OR gate chip 62 are electrically connected to the south bridge 10 to receive the enable signals CPU1-vtt-pwrgd and CPU1-vtt-pwrgd. The output port of the OR gate chip 62 is electrically connected to the input port of the second inverter 64, the output port of the second inverter 64 is electrically connected to the clock chip 20 to provide and send a command signal thereto. Allowing the clock chip 20 to provide and send clock signals to the first CPU 30 and/or the second CPU 40. Moreover, the first inverter 52 and the second inverter 64 can be NOT gate chips.

In use, referring to FIG. 2, the first CPU 30 and the second CPU 40 are installed on the mainboard and are in the normal operation states. The identification pin of the first CPU 30 generates and provides a low level identification signal CPU1-skt(L) for the input port of the first inverter 52, providing a high level signal for an input port of the AND gate chip 54. The other input port of the AND gate chip 54 receives a high level operation signal CPU1-fail(H) from the first CPU 30. Thus, the output port of the AND gate chip 54 outputs a high level switch command signal to control the switch 56 to electrically connect the first CPU 30, making the south bridge 10 to electrically connect the first CPU 30 through the switch control module 50. Understandably, even if the second CPU 40 is unusable or uninstalled on the mainboard, the south bridge 10 and the first CPU 30 can also work normally.

Figure 3:
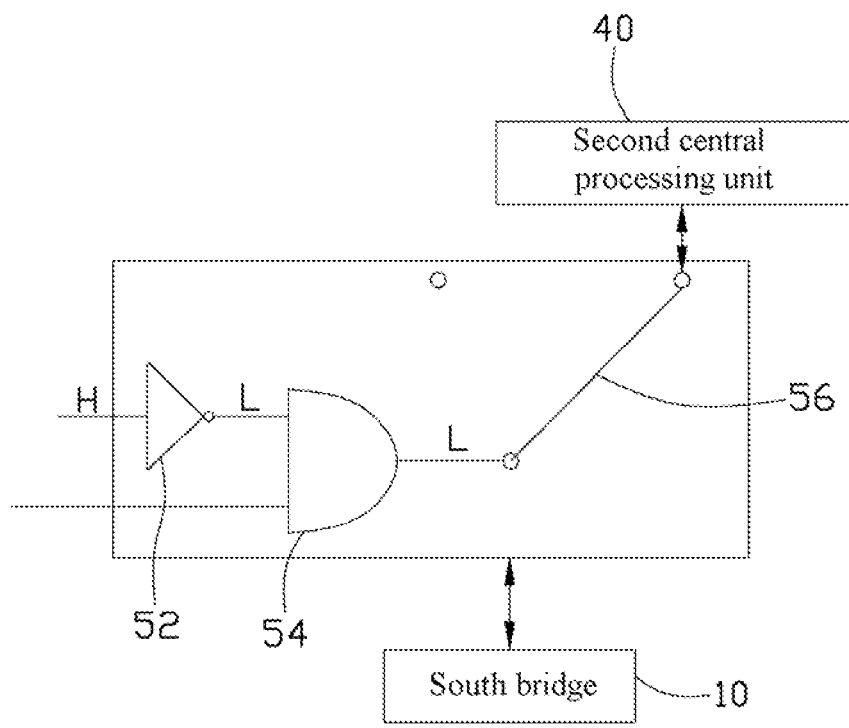
FIG. 3 is a circuit view of the south bridge, the second central processing unit and the switch control module of one embodiment as shown in FIG. 1.

Referring to FIG. 3, the input port of the first inverter 52 receives a high level signal, its output port accordingly outputs a corresponding low level signal to the input port of the AND gate chip 54. Thus, the AND gate chip 54 outputs a corresponding low level switch command signal to control the switch 56 to electrically connect the second CPU 40.

Figure 4:
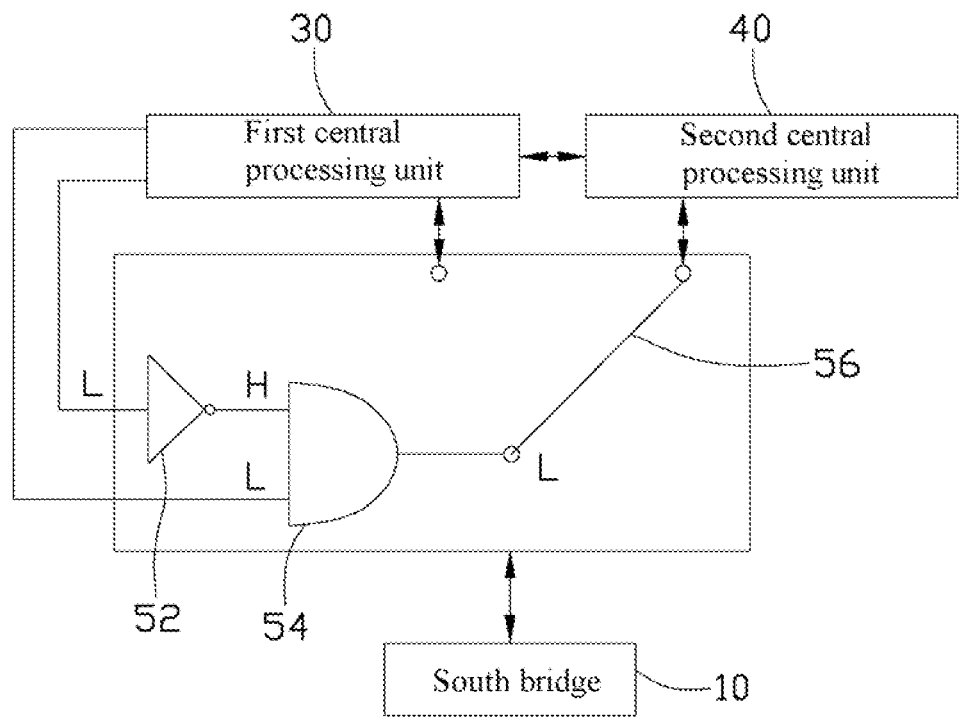
FIG. 4 is a circuit view when the south bridge electrically connects the second central processing unit of the bootstrap system of one embodiment as shown in FIG. 1.

Referring to FIG. 4, the first CPU 30 and the second CPU 40 are installed on the mainboard, if the first CPU 30 is damaged and/or is in abnormal operation state. The identification pin of the first CPU 30 provides and sends a low level identification signal CPU1-skt(L) to the input port of the first inverter 52, providing a corresponding high level signal for an input port of the AND gate chip 54. The other input port of the AND gate chip 54 receives a low level operation signal CPU1-fail(L) from the first CPU 30. Thus, the AND gate chip 54 outputs a corresponding low level switch command signal to control the switch 56 to electrically connect the second CPU 40.

Figure 5:
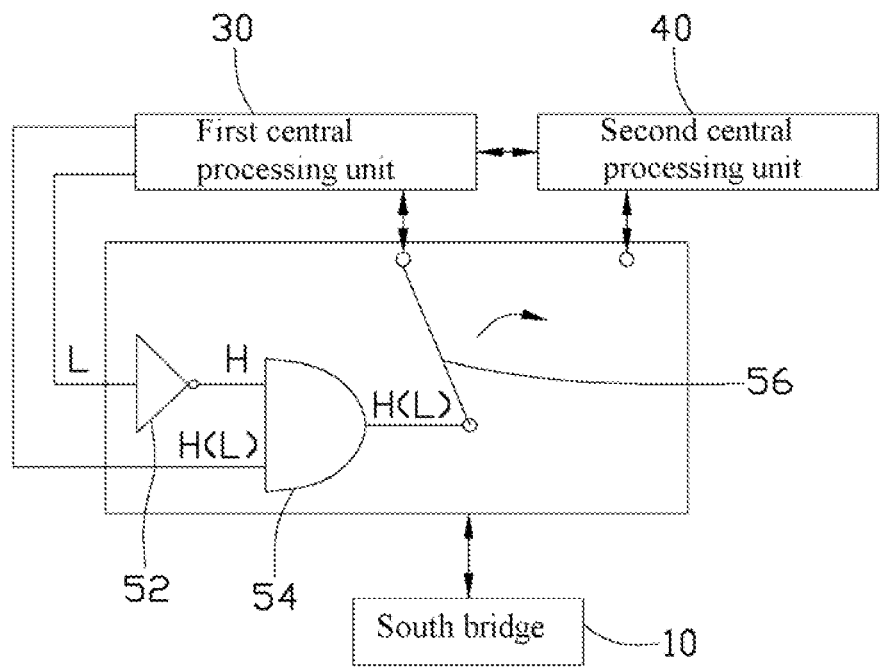
FIG. 5 is a circuit view when the first central processing unit of the bootstrap system works abnormally of one embodiment as shown in FIG. 1.

Referring to FIG. 5, the first CPU 30 and the second CPU 40 are installed on the mainboard and are in the normal operation states, the south bridge 10 is electrically connected to the first CPU 30 through the switch control module 50. When the first CPU 30 is damaged and/or works abnormally, the operation signal CPU1-fail from the first CPU 30 is changed from CPU1-fail(H) into CPU1-fail(L). Thus, the output port of the AND gate chip 54 outputs a corresponding low level switch command signal to enable the switch 56 to electrically connect the second CPU 40, making the south bridge 10 electrically connect the second CPU 40 through the switch control module 50.

Figure 6:
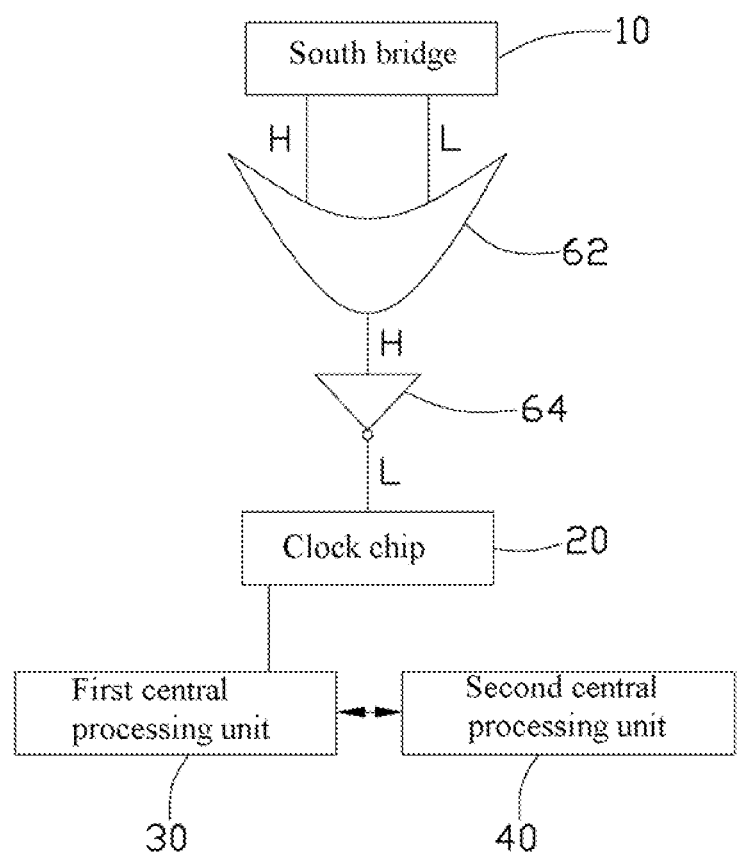
FIG. 6 is a circuit view when the clock enable circuit of the bootstrap system in an operation state of one embodiment as shown in FIG. 1.

Referring to FIG. 6, the two input ports of the OR gate chip 62 receive the enable signals CPU1-vtt-pwrgd and CPU1-vtt-pwrgd from the south bridge 10. When the enable signal(s) CPU1-vtt-pwrgd and/or CPU1-vtt-pwrgd are/is high, the output port of the OR gate chip 62 outputs a corresponding high level signal. Thus, the output port of the second inverter 64 generates and sends a corresponding low level command signal to the clock chip 20 to control the clock chip 20 to provide and send clock signals to the first CPU 30 and/or the second CPU 40.

In summary, in the bootstrap system 100 for dual CPUs of the exemplary embodiment, the south bridge 10 is selectably and electrically connected to the first CPU 30 or the second CPU 40 under the control of the switch control module 50, providing enable signals and reset signals for the two CPUs 30 and 40. The clock enable circuit 60 is used to provide clock signals for the CPUs 30 and 40. Thus, even if the first CPU 30 used as the BSP is damaged and/or fail to operate normally, the bootstrap system 100 for dual CPUs can still normally perform the bootstrap programs through the second CPU 40.

It is to be understood, however, that even though numerous characteristics and advantages of the exemplary disclosure have been set forth in the foregoing description, together with details of the structure and function of the exemplary disclosure, the disclosure is illustrative only, and changes may be made in detail, especially in matters of shape, size, and arrangement of parts within the principles of exemplary disclosure to the full extent indicated by the broad general meaning of the terms in which the appended claims are expressed.

What is claimed is:

1. A bootstrap system for dual central processing units, comprising:
    a south bridge for providing enable signals and reset signals;
    a first central processing unit for generating and providing an identification signal and an operation signal;
    a second central processing unit electrically connected to the first central processing unit, the second central processing unit for receiving the enable signals and reset signals; and
    a switch control module electrically connected to the south bridge, wherein the switch control module receives the identification signal and the operation signal from the first central processing unit to generate a corresponding switch command signal, the south bridge is selectably and electrically connected to the first central processing unit or the second central processing unit under the control of the switch command signal.

2. The bootstrap system as claimed in claim 1, wherein the switch control module comprises a first inverter and an AND gate chip, the first inverter comprises an input port and an output port, the AND gate chip comprises two input ports and an output port, and the input port of the first inverter is electrically connected to the first central processing unit to receive the identification signal, and the output port of the first inverter is electrically connected to an input port of the AND gate chip.

3. The bootstrap system as claimed in claim 2, wherein the switch control module further comprises a switch, the other input port of the AND gate chip is electrically connected to the first central processing unit to receive the operation signal, the output port of the AND gate chip is electrically connected to the switch to provide the switch command signal for the switch.

4. The bootstrap system as claimed in claim 3, wherein when the output port of the AND gate chip outputs a high level switch command signal to the switch, the switch is electrically connected to the first central processing unit, when the output port of the AND gate chip outputs a low level switch command signal to the switch, the switch is switched to electrically connect the second central processing unit, accordingly.

5. The bootstrap system as claimed in claim 3, wherein when the first central processing unit is in a normal operation state, the operation signal from the first processing unit is high, when the first central processing unit is in an abnormal operation state, the operation signal from the first central processing unit is low.

6. The bootstrap system as claimed in claim 5, wherein when the identification signal from the first central processing unit is low, an input port of the AND gate chip receives a high level signal, the other input of the AND gate chip receives the high level operation signal from the first central processing unit, the output port of the AND gate chip outputs a high level switch command signal to control the switch to electrically connect the first central processing unit.

7. The bootstrap system as claimed in claim 1, further comprising a clock chip electrically connected to the first central processing unit and the second central processing unit, wherein the clock chip generates and provides clock signals for the first central processing unit and the second central processing unit.

8. The bootstrap system as claimed in claim 7, further comprising a clock enable circuit electrically connected to the clock chip and the south bridge, wherein the clock enable circuit comprises an OR gate chip, the OR gate chip comprises two input ports and an output port, and the input ports of the OR gate chip are electrically connected to the south bridge to receive the enable signals.

9. The bootstrap system as claimed in claim 8, wherein the clock enable circuit further comprises an inverter comprising an input port and an output port, the output port of the OR gate chip is electrically connected to the input port of the inverter, the output port of the inverter is electrically connected to the clock chip to provide and send a command signal to the clock chip.

10. The bootstrap system as claimed in claim 9, wherein when the enable signal(s) from the south bridge are/is high, the output port of the OR gate chip outputs a corresponding high level signal, the output port of the inverter provides and sends a corresponding low level command signal to the clock chip to control the clock chip to send clock signals to the first central processing unit and the second central processing unit.

11. The bootstrap system as claimed in claim 1, wherein the first central processing unit is a boot strap processor and comprises an identification pin, the identification pin generates the identification signal.

12. A bootstrap system for dual central processing units, comprising:
  a south bridge;
  a first central processing unit for generating and providing an identification signal and an operation signal;
  a second central processing unit electrically connected to the first central processing unit; and
  a switch control module electrically connected to the south bridge, wherein the switch control module comprises a first inverter, an AND gate chip and a switch, the first inverter comprises an input port and an output port, the AND gate chip comprises two input ports and an output port, and the input port of the first inverter is electrically connected to the first central processing unit to receive the identification signal, and the output port of the first inverter is electrically connected to an input port of the AND gate chip, the other input port of the AND gate chip is electrically connected to the first central processing unit to receive the operation signal, the output port of the AND gate chip outputs a switch command signal and is electrically connected to the switch, the switch is selectably and electrically connected to the first central processing unit or the second central processing unit.

13. The bootstrap system as claimed in claim 12, wherein when the output port of the AND gate chip outputs a high level switch command signal to the switch, the switch is electrically connected to the first central processing unit, when the output port of the AND gate chip outputs a low level switch command signal to the switch, the switch is switched to electrically connect the second central processing unit, accordingly.

14. The bootstrap system as claimed in claim 12, wherein when the first central processing unit is in a normal operation state, the operation signal from the first processing unit is high, when the first central processing unit is in an abnormal operation state, the operation signal from the first central processing unit is low.

15. The bootstrap system as claimed in claim 14, wherein when the identification signal from the first central processing unit is low, an input port of the AND gate chip receives a high level signal, the other input of the AND gate chip receives the high level operation signal from the first central processing unit, the output port of the AND gate chip outputs a high level switch command signal to control the switch to electrically connect the first central processing unit.

16. The bootstrap system as claimed in claim 12, further comprising a clock chip electrically connected to the first central processing unit and the second central processing unit, wherein the clock chip generates and provides clock signals for the first central processing unit and the second central processing unit.

17. The bootstrap system as claimed in claim 16, further comprising a clock enable circuit electrically connected to the clock chip and the south bridge, wherein the clock enable circuit comprises an OR gate chip, the OR gate chip comprises two input ports and an output port, and the input ports of the OR gate chip are electrically connected to the south bridge to receive enable signals and reset signals from south bridge.

18. The bootstrap system as claimed in claim 17, wherein the clock enable circuit further comprises a second inverter comprising an input port and an output port, the output port of the OR gate chip is electrically connected to the input port of the second inverter, the output port of the second inverter is electrically connected to the clock chip to provide and send a command signal to the clock chip.

19. The bootstrap system as claimed in claim 18, wherein when the enable signal(s) from the south bridge are/is high, the output port of the OR gate chip outputs a corresponding high level signal, the output port of the second inverter provides and sends a corresponding low level command signal to the clock chip to control the clock chip to send clock signals to the first central processing unit and the second central processing unit.

20. The bootstrap system as claimed in claim 12, wherein the first central processing unit is a boot strap processor and comprises an identification pin, the identification pin generates the identification signal, and the priority of the first central processing unit is higher than the second central processing unit.

* * * * *